(12) United States Patent
Brett et al.

(10) Patent No.: US 6,525,765 B1
(45) Date of Patent: Feb. 25, 2003

(54) IMAGE PROCESSING

(75) Inventors: Stephen Brett, Sutton-at-Home (GB); Martin John Greenwood, London (GB)

(73) Assignee: Pandora International, Inc. (GB)

( * ) Notice: Subject to any disclaimer, the term of this patent is extended or adjusted under 35 U.S.C. 154(b) by 0 days.

(21) Appl. No.: 08/929,874

(22) Filed: Sep. 15, 1997

(51) Int. Cl.$^7$ ................................. H04N 3/36
(52) U.S. Cl. ................ 348/97; 348/97; 348/96; 348/699; 382/254; 382/317; 382/318
(58) Field of Search .................. 348/97, 96, 699, 348/416, 402, 413; 382/318, 254, 317

(56) References Cited

U.S. PATENT DOCUMENTS

| | | | | |
|---|---|---|---|---|
| 5,293,100 A | * | 3/1994 | Swinson et al. | 348/103 |
| 5,299,014 A | * | 3/1994 | Stansfield et al. | 348/100 |
| 5,619,258 A | * | 4/1997 | Gillespie | 348/97 |
| 5,805,207 A | * | 9/1998 | Watkinson et al. | 348/97 |
| 5,832,133 A | * | 11/1998 | Smith | 348/96 |

FOREIGN PATENT DOCUMENTS

| | | |
|---|---|---|
| EP | 0056848 | 8/1982 |
| EP | 0537945 A1 | 10/1992 |
| GB | 2256568 A | 5/1991 |
| GB | 2283384 | 5/1995 |
| GB | 2312582 A | 1/1996 |
| GB | 2302630 | 1/1997 |
| GB | 2304932 | 3/1997 |
| WO | WO95/12289 A1 | 10/1994 |

* cited by examiner

*Primary Examiner*—Chris Kelley
*Assistant Examiner*—Shawn S. An
(74) *Attorney, Agent, or Firm*—McDonnell Boehnen Hulbert & Berghoff

(57) ABSTRACT

There is disclosed a method of processing digital image data, wherein cinematographic film is scanned to produce digital image data corresponding to the image(s) stored on the film; the digital image data is stored in data storage means; adjustments are made to the digital image data by a processor at the request of an operator; when an adjustment is requested by an operator the adjustment is compared to predetermined criteria; and a signal is generated if the adjustment requires the digital image data to be re-scanned from the film. There is also disclosed a method of processing digital image data, produced by scanning a plurality of frames of cinematographic film, wherein a region of a frame of digital image data is selected and that region is replaced with a computer generated image data.

2 Claims, 4 Drawing Sheets

IMAGE PROCESSING

This application claims priority to Great Britain application No. 9619173.9 filed Sep. 13, 1996 and Great Britain application No. 9707019.7 filed April 07, 1997.

FIELD OF INVENTION

The present invention relates to image processing, and in particular to the conversion of film images to video images and the colour correction of such images.

BACKGROUND OF THE INVENTION

Currently, there exist specialist machines ("telecine" machines) to scan cinema style motion picture film, and derive electrical signals for recording onto videotape or broadcasting as television pictures. One such example of this is the 'URSA' telecine, manufactured by Rank Cintel Ltd. in Ware, England.

It is known to have a 'grading' mode for these telecines, where scenes are studied, and a colour correction data set is visually determined for individual scenes. The process of building up a series of colour correction values for a number of scenes, which is then used in a real time 'transfer' mode to effect the colour correction is taught in U.S. Pat. No. 4,096,523. An example of a telecine controller and programmer embodying such a process is the 'POGLE' produced by Pandora International Ltd.

External visual picture still-store devices, such as the Rank Cintel 'Matchbox' are also known, and these can be used in conjunction with a telecine and programmer to view images from individual scenes. The use of such still stores, in conjunction with a controller, is taught in U.S. Pat. No. 4,763,186. From this document it is known to display a "storyboard" of the overall film work to be transferred by using a TV monitor screen as a 'polyphoto' displaying an array of, for example, 5 by 4 pictures (20 pictures in all) corresponding to individual scenes of the cinematographic work. Such a system provides the user with a 'link' between miniature displays of stored still frames of picture relating to each scene for 'cueing' the telecine to the associated scene, and recalling the associated correction data.

It is also known to store a graded transfer of a film on a magnetic or optical hard-disk or in a RAM system. One such video disk system is designed and manufactured by Abekas Ltd, of the USA and an example of a RAM (Random Access Memory) system is the 'SSVR' (Solid State Video Recorder) manufactured by Questech Ltd of Wokingham, England.

In this case, if the controller is instructed to display a given scene, it can instantly replay that scene from the hard disk or RAM store. This saves waiting for the telecine to rewind, and also offers the advantage of putting less 'wear and tear' on the valuable camera original film.

Current telecine controllers present the user with a list of 'scene change' data involving alphanumeric data containing information about the frame number associated with the start and end of that scene, together with information contained in an operator defined comment field, such as 'Girl in red dress' or similar.

Visual references can also be provided separately in the form of one still frame per scene, which can be displayed on a still store of the 'Matchbox' type.

The alphanumeric data relating to scene changes is presented to the user, in known systems, on the VDU of a computer terminal. For example in the POGLE controller/programmer, produced by Pandora International Ltd. an industry standard Silicon Graphics "INDY" terminal has been used as the interface, although this terminal is longer available.

SUMMARY OF THE INVENTION

According to the present invention, a method of processing digital image data is provided, wherein cinematographic film is scanned to produce digital image data corresponding to the image(s) stored on the film; the digital image data is stored in data storage means; adjustments are made to the digital image data by a processor at the request of an operator; when an adjustment is requested by an operator the adjustment is compared to predetermined criteria; and a signal is generated if the adjustment requires the digital image data to be re-scanned from the film.

DESCRIPTION OF THE PREFERRED EMBODIMENTS OF THE INVENTION

Figure 1A:
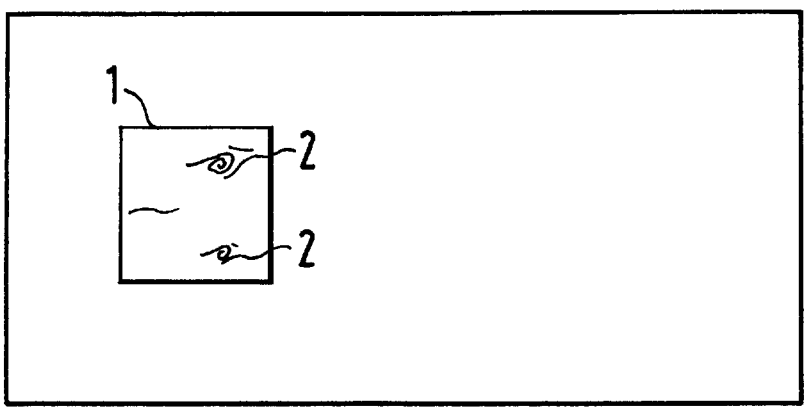
FIGS. 1a–1c show an object with a texture applied thereto at first, second and third positions in a film frame.

It is proposed according to an invention disclosed herein to store a graded transfer of the film onto the built-in hard disc of a controller/programmer computer terminal, for example a Silicon Graphics '02' that is being used for the presentation user interface. This may be done either using data compression, such as the ISO defined JPEG or MPEG algorithms, or using uncompressed data. Typical broadcast quality video frames require 1 Mb per frame uncompressed. An industry standard 1 Gb SCSI drive can therefore store 1000 frames, or 40 seconds of uncompressed data. With a compression ratio of 25 to 1, this would become 1000 seconds, or 17 minutes. More discs could be added for further storage if possible. Disc drives are readily and inexpensively obtainable up to 9 Gbytes. "Workstation Disc" drives are available from Accom, of Menlo Park, Calif. USA and Sierra, of Incline Village, Nevada, USA, among others. Such devices are operating system or file structure independent as they allow input and output in a broadcast image CCIR format. This provides a convenient alternative to the hard disc of the SGI terminal. A further external peripheral is the "Mediapool" system manufactured by Philips, of Simi Vally, Calif., USA.

Typically, a 190 MHz SGI '02' computer may be used, equipped with a R5000 processor, 64 Mbytes of RAM and a 2 Gbyte disc drive. The computer will generally run the SGI operating system IRIX either version 6.2 or 6.3 and as a compiler the IRIX IDO 'C' computer may be used.

Thus grading operations can take place on the stored image data and the system can instantly display small changes to the grading, by regrading the data stored on the local magnetic or optical hard disc. If a regrading operation bigger than a certain threshold is requested, the system can be programmed to display a message that the size of adjustment is so large that to obtain the optimum quality the original film should be rescanned with the appropriate grading setting. This is necessary because any digital representation of the film is likely to be limited by the quantization levels involved in the scanning process, and if the data isn't captured with the required levels of spatial or chromatic resolution, then those levels cannot be operated on.

One method which may be used to determine, at least in part, the threshold at which rescanning should be advised is differentiate between telecine corrections and controller corrections. Certain adjustment to the parameters of the image are made when the film image is transferred to a video image. These include gain, gamma and black level which are adjusted when the film image is quantised to produce the digital video image. Further adjustments may be made using a digital colour processor or the like, by altering the parameters of the digital video image. However, the digital video image will always be subject to the adjustments made and the quantization at the scanning stage. Thus, if an adjustment of a parameter such as gain gamma or black level is required then it is likely that rescanning of the film will be necessary. However, if the adjustment is to the parameter of the digital video image the rescanning of the film will not affect this adjustment and is therefore not required. Minor adjustments can be made to the telecine adjustable parameters of the digital image by the processor without the need for rescanning.

Thus according to an invention disclosed herein a system is provided for storing a digital image on a magnetic or optical hard disk, or other suitable storage means and allowing grading of the stored image data, the user being notified if a grading operation on the stored data would be better effected by rescanning the original film with the appropriate grading setting. The hard disk may be the local disk of a computer terminal such as the Silicon Graphics '02' or a separate disk such as the Abekas disk.

The system may operate in several levels of resolution. The first being the highest quality image as obtainable from the film, i.e. so-called "film resolution", which is a resolution level of a digital image that corresponds approximately in spatial resolution to that of film. This film resolution image can at anytime be 'regrabbed' from the film, if it is required to be, for example, resized. Thus the pixels at this stage correspond to the highest quality that can be obtained from film. This resolution can be thought of as 'telecine resolution'.

An alternative, lower level of resolution is D1 (as defined by the CCIR).

A second resolution is the resolution that is on an 'ABEKAS' type disc. Until the stage at which this is requested to be changed (in grading, or size) this is identical to the first resolution. Another way of regarding this stage is as a 'local copy' of the film image, which may or may not have 'local edits' applied to the image.

A third resolution is the image as seen on the presentation computer screen. This is not likely to be 'full screen' and is more likely to be a 'mini-picture' or even an icon, which may be created using the image functions in the SGI "Open GL" graphic description libraries.

It is also possible that some or all of the stored images may have undergone data compression (such as the ISO defined JPEG or MPEG systems). In practice, it makes sense to compress the third resolution, where the fidelity is lower, as then it does not matter if minute artefacts are introduced.

The stored image data on the terminal hard-disk can be advantageously used in the control and monitoring of colour correction processes. Thus in another invention disclosed herein the terminal video system is used to provide 'icons' or miniature representations of images from each scene, as a visual 'cue' to the operator as to which scene the displayed numerical information relates. Possible extensions to this are to have the 'first and last' frames of the scene displayed together with the alphanumeric data of that scene, or a single 'representative' frame relating to the scene, or possibly both of the above.

The representative frame may initially be chosen as the first frame of the scene. However, it is likely that the operator of the system will choose one frame of the scene on which to base any grading decisions and may "park" the telecine at that frame. In this event the representative frame may be changed to that selected by the operator. Thus, this representative frame will be appropriate for the identification of the scene should further grading or re-grading be required.

Thus, in this system the user is able to see the exact correspondence between the scene data, ie the numerical information and the image(s) involved in that scene on a single VDU. This represents an advance over the known systems involving "Matchbox" type units in which the two forms of data are kept separate.

A further extension (probably in the case of the 'representative' scene) is to provide a mechanism where when the operator 'clicks' with a mouse on, or otherwise activates, the icon, the terminal 'plays' the scene in miniature. It would also be possible to develop the system so that when the controller is instructed to 'play' the sequence of scenes, the scene change list scrolls up the VDU with the icon in the scene that is active 'playing' in real time. This system could also provide a mechanism to alter the content or appearance of these miniatures or icons in response to successive grading, because it is important that the icons are representative of the scene in question. Advantageously, this system may also be used to cue the telecine to a particular point in a sequence of frames by stopping the playing icon at the required point.

In a further selectable mode using the stored image data, it may be desirable to use the VDU display on the computer to display a 'storyboard' of the overall film work to be transferred. Whilst it is known to use a TV monitor screen as a 'polyphoto', according to another invention disclosed herein the mini pictures are organised into a novel hierarchical or tree structure. For example, for a polyphoto display of the 4 by 5 pictures, we may have a photographic film containing 40 scenes. Thus we may have twice as many scenes as we can display polyphotos of. One such algorithm which may be applied is to display the representative scene from every second scene. A more intelligent algorithm would display a representative scene from the twenty longest scenes on the grounds that these are more important. An important feature of the hierarchical data structure is that groups of scenes may be selected and "expanded" to reveal the next level down in the tree relating to those scenes. For example, if we click on the bottom half of the screen, we would then see the events expanded from the bottom half to fill the screen (In the case above we would see the last 20 of the 40 events)

In general, colour correction may be required for an entire work made up of a number of scenes, each of which may have several "takes". The scenes and the takes of each may be distributed through several reels of films. Thus, a list of the sequences of frames as they appear on the reels of film may bear no sequential relationship to the desired running order of the eventual work. For example the first reel may contain scenes 4 and 1 followed by take 1 of scenes 3 and 2 and take 2 of scenes 3 and 5. Each of these scenes can be identified by the timecode of its start and end. An edit decision list (EDL) can be produced identifying the scenes and takes and their correct order in the eventual work by their timecodes. For example, only one take of any particular scene may be used in the final work and this can be identified in the EDL. In this situation, the storyboard referred to above may be arranged to correspond to the order of the EDL rather than the order of the scenes and takes on the reels. This has the advantage that the storyboard will more logically reflect the running order of the eventual work and that only one take for each scene will be included in the storyboard, reducing the total amount of scenes shown. Of course, if desired, the storyboard may reflect the arrangement of scenes and takes on the reels, or any other desired order.

It is important to realise that we could have many more than two levels of such a display. In a two hour feature film we may have hundreds of scenes, and twenty or more levels of hierarchy.

Preferably there may be three or more levels comprising an 'overview' level, consisting of possibly the contents of a several reel production, a second level consisting of for example the contents of each reel, and a third level of one representative frame from each scene.

Overall, the telecine grading system may operate in a mode where we transfer the film to video using a fairly coarse grading (referred to as a 'one light', where the grading is kept constant for all scenes) Alternatively, an 'auto' grading may be done, where on the basis of some histogram sorting algorithm we derive a 'best guess' for each scene. From this, we could see from the representative frames on the monitor which scenes 'look' good, and which are definitely in need of 'manual' grading.

Figure 4:
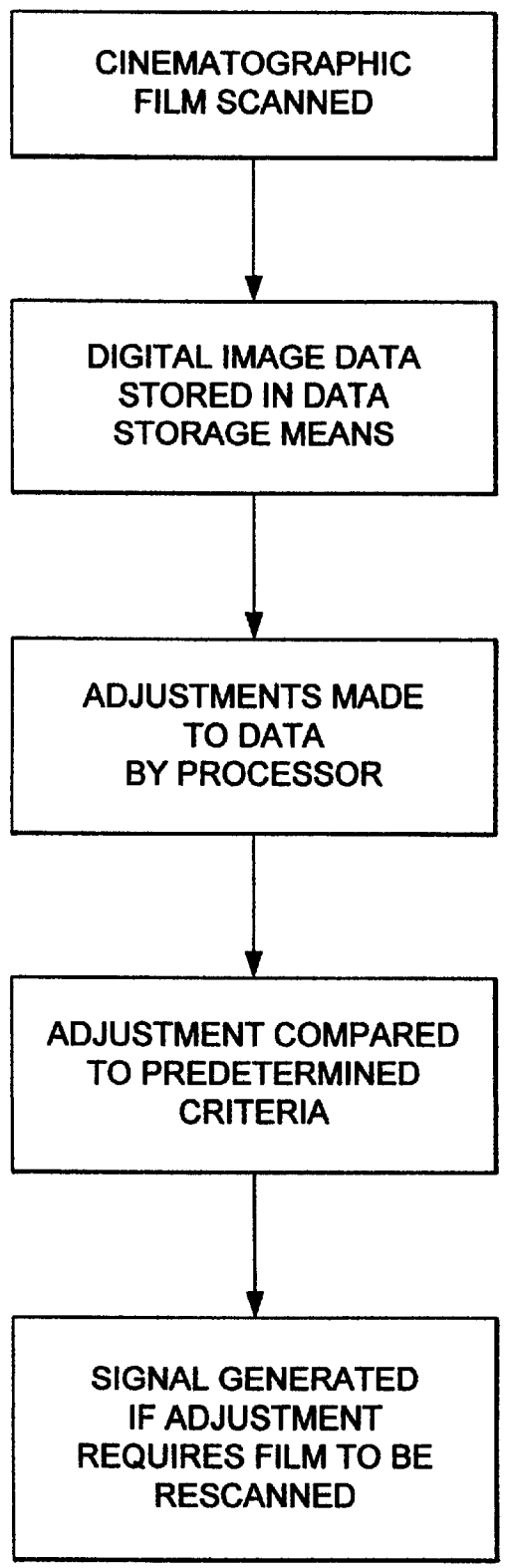
FIG. 4 is a flow diagram illustrating a method of processing digital image data according to a first embodiment of the invention.

FIG. 4 shows a method of processing digital image data as described above. As shown in FIG. 4, cinematographic film is scanned to produce digital image data corresponding to the image(s) stored on the film; the digital image data is stored in data storage means; adjustments are made to the digital image data by a processor at the request of an operator; when an adjustment is requested by an operator the adjustment is compared to predetermined criteria; and a signal is generated if the adjustment requires the digital image data to be re-scanned from the film.

Yet a further development of the above system involves the use of Graphic Description Languages (GDL's). These are well known, but will be recapped here using an example of one such language—the Silicon Graphics 'Open GL' language. This is a high level language used to 'build up' computer generated scenes. The programmer may use commands to, for example, choose a background colour, and on this background generate a spherical object of a defined size and position. This object can have associated with it a 'depth'. Other geometrically defined or 'point by point' defined objects can be added, coloured, and positioned in three dimensional space. 'Lighting' can be specified, in colour, direction, and positioning (this is where the '3D' positioning comes into use). Also, 'fog' can be generated giving the images a hazy look which makes them appear more realistic, and 'textures' can be added to objects. For example, the sphere mentioned earlier can have a 'wood' finish applied to it, or the foreground may be covered in 'grass'. It must be understood that this is only a very quick 'overview' of such a language as 'Open GL'.

Whilst Graphic Description Languages are known, another invention disclosed herein consists of a novel use of a combination of products, namely a picture source (probably a telecine), together with a video colour correction and isolation system (such as the Pandora DCP and POGLE), and a product as described above, for example the Pandora Pogle using a Silicon Graphics Indy workstation.

GDL's are conventionally only used to produce entirely computer generated scenes. With the above combination we can take real filmed scenes, and use the DCP to isolate selected colours, for example the dark reds. Normally the DCP would modify these dark reds to be of a different hue as chosen by the operator. However, in this case, the operator would use the original image stored in the computer workstation according to the invention, together with the 'matte' produced by the DCP, which describes the area of the dark red colours. In the workstation he could use a GDL texture library to specify the replacement of the 'dark reds' with for example 'brick wall texture'. For textures not in the library, we can specify them using a 'procedural' description in the GDL (essentially a descriptor list to produce 'brick wall'). Thus a composite scene can be produced, in either the DCP or the workstation, containing elements of the original scene and computer generated information.

According to an invention disclosed herein there is provided a system for isolating a selected region of an image of a particular colour or group of colours and replacing that region with a computer generated image such as a pattern.

A further development of the above is where we wish to generate objects with depth, for example a 'brick drive' where the end of the drive is at a vanishing point. We would obviously like the bricks to get smaller as they go off into the distance. Thus we can look at the scene and associate with certain points an operator specified 'depth'. Thus we could give the foreground a depth of 3 feet, and the vanishing point a depth of 1000 feet. This data could be used in the procedural model for generating 'brick' to ensure that the bricks get smaller as we get towards the back of the scene. Note that for simple examples we can linearly interpolate between specified depth points, but for more complex examples (such as a 'brick' sphere) we would need a higher order interpolation over three or more points.

According to an invention disclosed herein there is provided a system which allows the assignment of depth parameters to elements of an image which may have been selected as regions of a particular colour and subsequently manipulating the image with reference to the depth parameters. The depth parameters may be assigned manually by an operator who estimates the position of the elements in the notional third dimension of the image.

The above techniques work well on stationary images with a stationary camera. However, for maximum reality, it is necessary to adapt these techniques for cases in which the image may comprise moving elements.

Thus, in a further development of the present system, the texture or pattern applied to an object included in the image may be manipulated with reference to the object's position in the scene. In particular, an object which is seen to move from a first position in a scene to a second position during a film or video sequence has applied to it a texture or pattern that is seen to move with the object.

Taking the example of a video or film sequence shot with a stationary camera in which, during the scene, a cardboard box is carried across the field of view, there exist many techniques, such as are disclosed in WO 95/12289, for detecting that region of the frame that makes up the cardboard box. Such techniques include detecting the cardboard box by its colour, lightness, shape, texture, or a mixture of some or all of these. Once the box has been detected, the techniques described above may be used to apply, for example, a 'wooden' texture to the box. This wood texture, if it is 'pine', may well have identifiable 'knots' in it. As the box moves across the scene, it is important for reality that the position of the 'knots' in the 'wood' remain in a constant place on the box. If this is not done, the effect that will be generated has the appearance of an image of wood projected onto the cardboard box from a slide projector that is out of the scene of the picture. Whilst the effect may be desirable for some special cases, generally it is undesirable. This problem is illustrated in FIGS. 1a, 1b, and 1c.

Figure 1B:
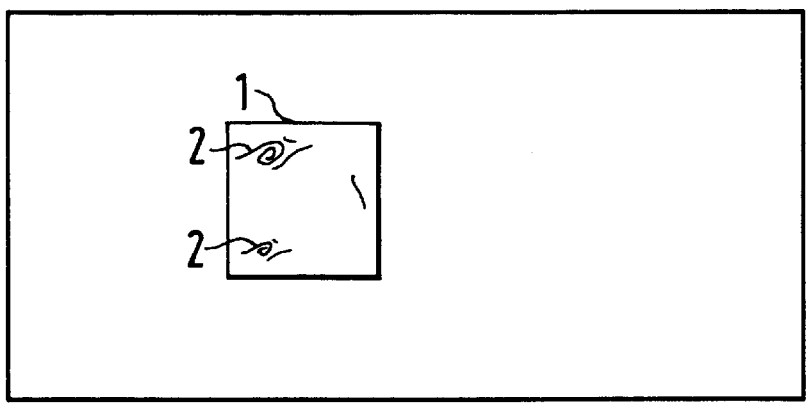
Figure 1C:
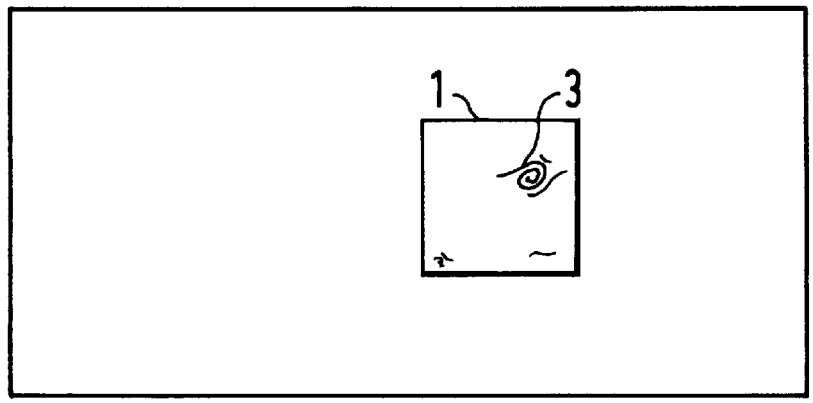

FIG. 1a shows an object 1, such as a cardboard box, at a first position in a film frame. A texture, such as a wood effect, has been applied to the box 1, which texture includes details, such as knots 2. In FIG. 1b, which represents a subsequent frame, the box 1 has moved within the frame to a second position. However, the texture has maintained a constant position relative to the frame, such that the knots 2 now appear on the left-hand side of the box 1 rather than the right-hand side as was the case in FIG. 1a. FIG. 1c shows the situation in a further frame. In this case, the knots 2 of FIGS. 1a and 1b are no longer visible on the box 1, but a new knot 3 has appeared on the box.

This problem of the texture moving relative to the object to which it is applied will also occur in cases where the cardboard box is stationary in the scene, and the camera pans across the scene.

Thus according to the present development of the system the texture applied to the object is generated, for example using a graphic descriptor language, with reference to the position, or change in position, of the object relative to the frame. In this way, the texture moves with the object to give a realistic impression.

One method of realising the development of the present system utilises the methods for locating and tracking an object disclosed in WO 95/12289.

This document discloses techniques to locate objects in several key frames and from the knowledge of the position of the object at a number of different times, a motion vector or similar is derived. WO 95/12289 includes techniques for block matching to derive the motion vector, which may also be used in conjunction with the system disclosed herein.

Figure 2A:
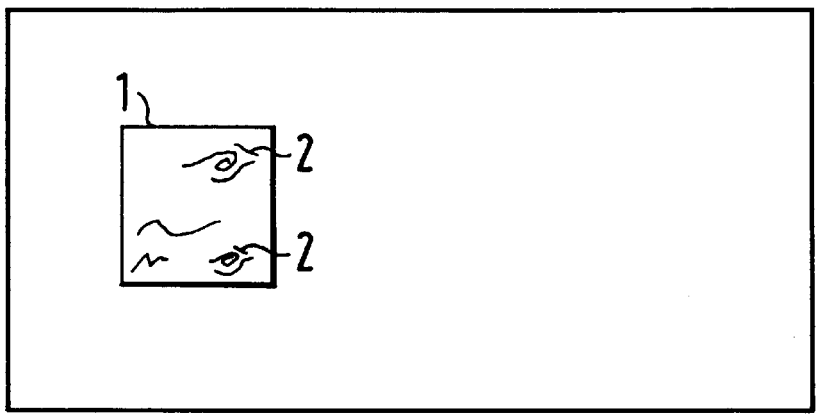
FIGS. 2a–2c correspond to FIGS. 1a and 1c but with the texture applied to the object by a different method.
Figure 2B:
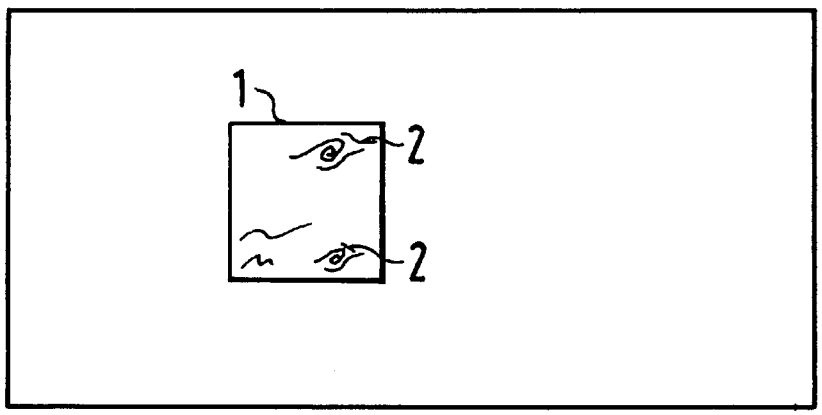
Figure 2C:
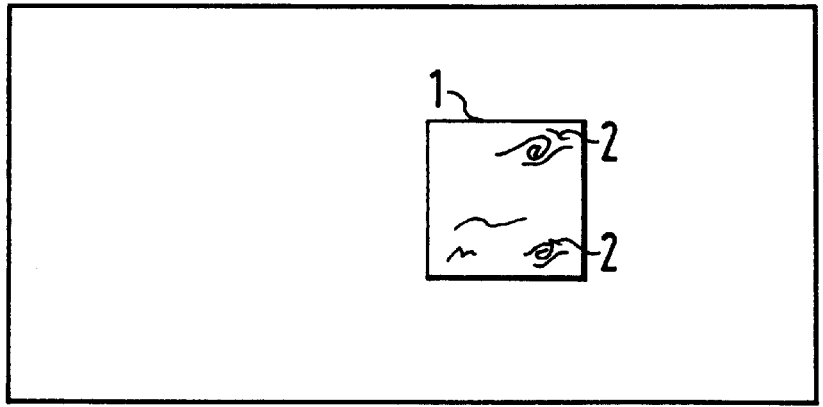

One solution to the problem described above is to apply the resultant motion vector calculated from a number of positions of the box to the origin point of the texture map. Thus, identifiable points of detail, such as the knots in the illustration above will move with the cardboard box, thereby portraying a greater degree of realism than is otherwise possible. This effect is illustrated in FIGS. 2a, 2b, and 2c which correspond to FIGS. 1a to 1c. However, in these figures, it is shown that the knots 2 of the wood texture maintain their positions relative to the box 1, as the box moves relative to the frame.

Whilst this technique works well if the cardboard box only moves in the x or y plane of the image, in real situations the box will move in three dimensional space. To maintain the desired impression of reality, the texture map must be warped to correspond to the detected motion of the box. A simple example of this is where the box is full on to the camera at the start of the scene (as shown in FIG. 3a), and the right hand edge of the box is moved away from the camera over a number of frames (as shown in FIG. 3b).

Figure 3A:
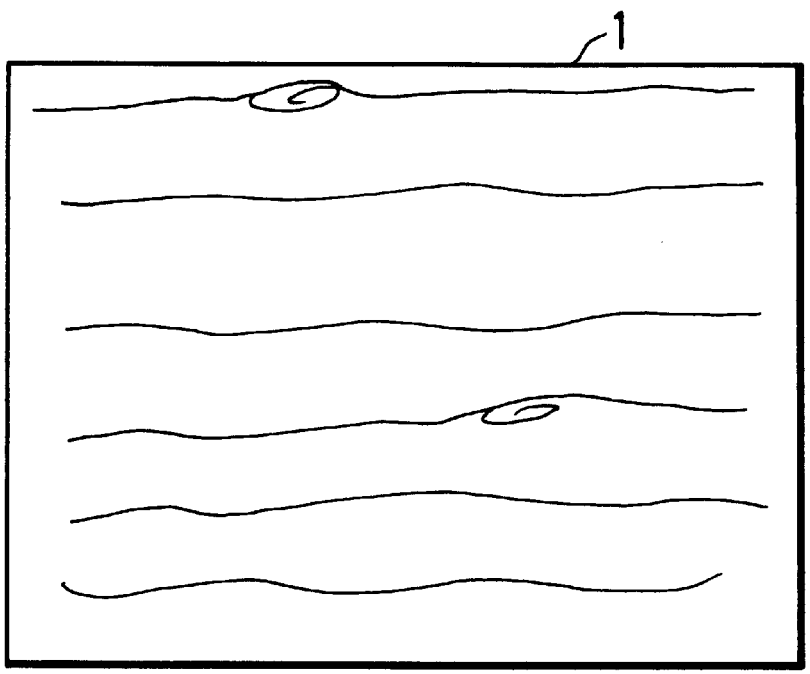
FIGS. 3a and 3b show the effect of the angle of an object in an image on the texture applied to the object.
Figure 3B:
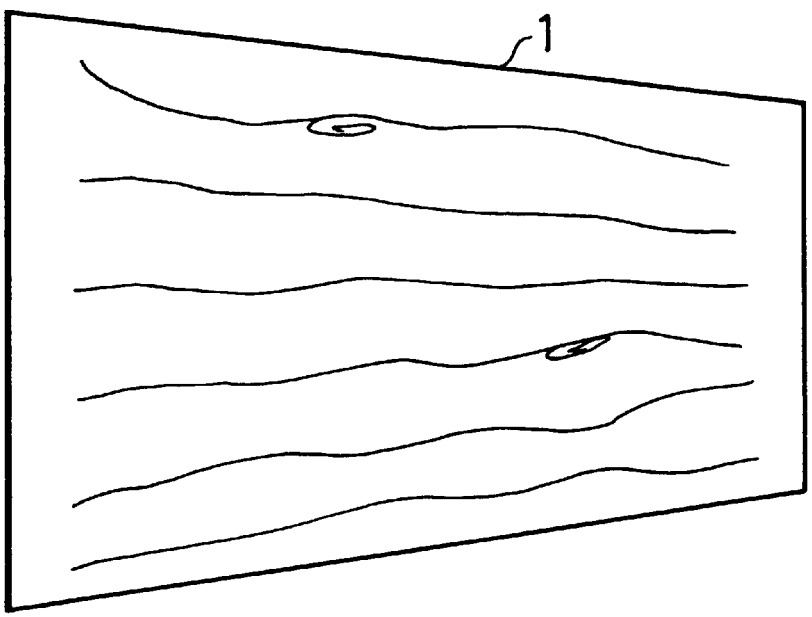

By using the block matching techniques disclosed in WO 95/12289, it is possible to detect, for example, the corners of the box in both of the key frames of FIGS. 3a and 3b. From this distortion (in this case a transformation from square to trapezium) it is possible to deduce the necessary remapping to apply to the texture map memory to maintain the appearance of reality. Thus, the motion vector applied to the texture map may contain not only information relating to the change in position of the object in the film frame, but also information relating to a change in the shape or size of the object, which may represent a change in the distance of the object from the viewer or a change in the orientation of the object relative to the viewer. Advantageously, depth information may be assigned to one or more points on the object in the manner described above, and in one or more frames. A three-dimensional motion vector may thereby be calculated for the object. The three-dimensional motion vector may then be used to manipulate the texture applied to the object so that the texture moves realistically with the object.

Yet a further development of the above is that once we have depth information, we can make use of the facilities of the graphics descriptor language to add 'light sources'. Thus it would be possible to relight scenes shot on film. The same applies to the use of 'fog' textures.

As yet another further development, since the DCP is built up of programmable logic we could use the (slow) workstation under the GDL to develop a 'library'of effects, which could be cross compiled into programmable logic (for example an Open GL to 'XYlinX' converter).

Thus after effects have been tried in the GDL, we could fairly easily produce hardware to do the same in real time.

It is to be understood that the inventions disclosed above may be used in combination or separately. In reference to the foregoing inventions, particular terms are intended to encompass all means or methods suitable to obtain the required effect and are not intended to limit the scope of any invention to the elements specifically mentioned.

What is claimed is:

1. A method of processing digital image data, wherein cinematographic film is scanned to produce digital image data corresponding to the image(s) stored on the film; the digital image data is stored in data storage means; adjustments are made to the digital image data by a processor at the request of an operator; when an adjustment is requested by an operator the adjustment is compared to predetermined criteria; a signal is generated if a comparison of the adjustment to the predetermined criteria determines that the digital image data should be re-scanned from the film; wherein a region of a frame of digital image data is selected and that region is replaced with a computer generated image data; and wherein depth information is associated with at least one point in the selected region and the computer generated image data is calculated by reference to the depth information.

2. A method of processing digital image data, wherein cinematographic film is scanned to produce digital image data corresponding to the image(s) stored on the film; the digital image data is stored in data storage means; adjustments are made to the digital image data by a processor at the request of an operator; when an adjustment is requested by the operator the adjustment is compared to predetermined criteria; a signal is generated if a comparison of the adjustment to the predetermined criteria determines that the size of the adjustment is so large that to obtain optimum quality the digital image data should be rescanned from the film with the adjustment being made during rescanning; and, if no signal is generated, the adjustment is made directly to the stored digital image without rescanning the film, wherein a region of a frame of digital image data is selected and that region is replaced with a computer generated image data, and wherein depth information is associated with at least one point in the selected region and the computer generated image data is calculated by reference to the depth information.

* * * * *